May 23, 1961  B. N. TORELL  2,984,969
AFTERBURNER CONTROL FOR A MULTISPOOL GAS TURBINE POWER PLANT
Filed Dec. 29, 1955
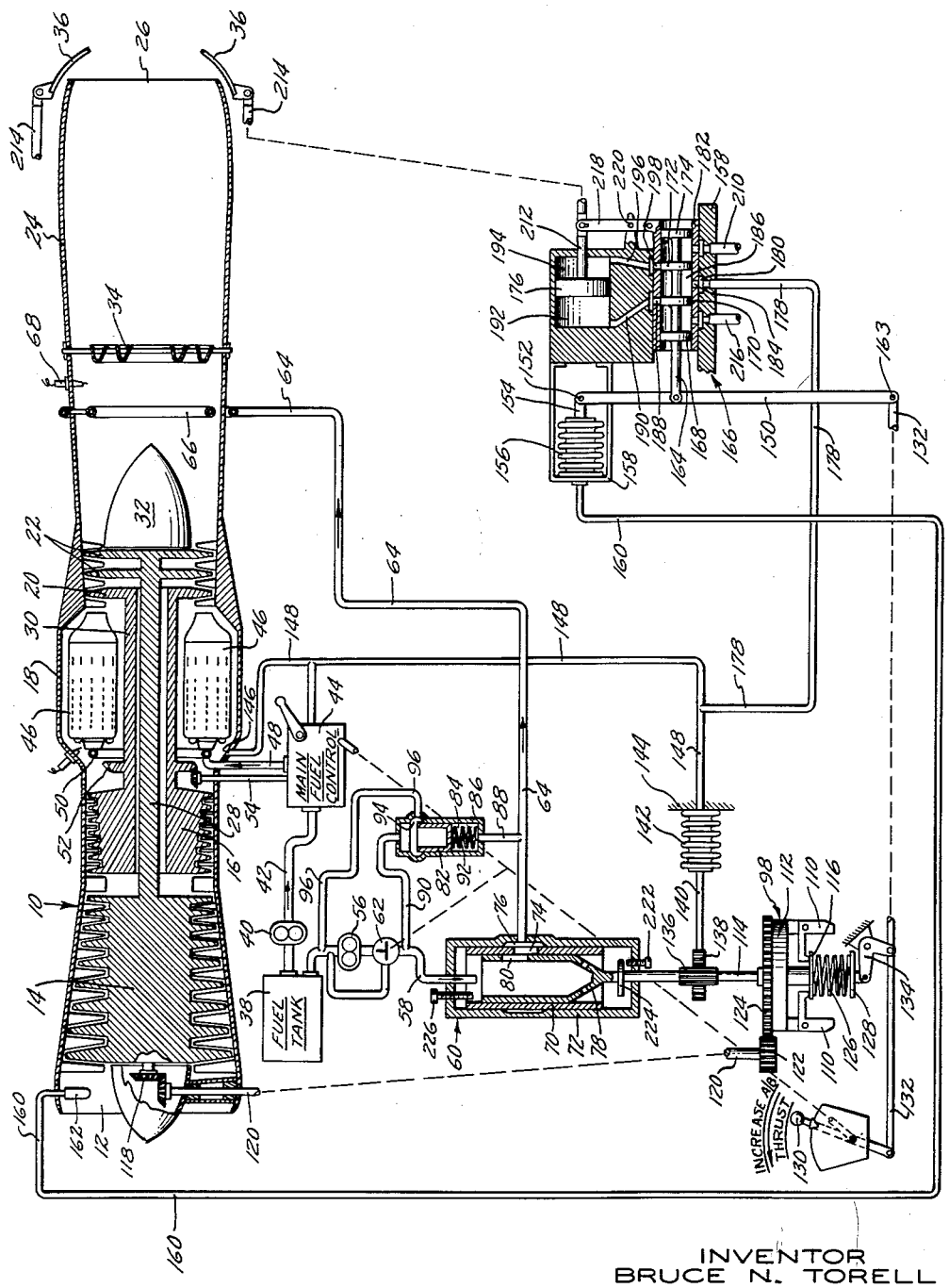
INVENTOR
BRUCE N. TORELL
BY
ATTORNEY

United States Patent Office 2,984,969
Patented May 23, 1961

2,984,969
AFTERBURNER CONTROL FOR A MULTISPOOL GAS TURBINE POWER PLANT

Bruce N. Torell, Wethersfield, Conn., assignor to United Aircraft Corporation, East Hartford, Conn., a corporation of Delaware Filed Dec. 29, 1955, Ser. No. 556,275

8 Claims. (Cl. 60—35.6)

This invention relates to multispool, afterburning gas turbine power plants for aircraft, more particularly to an afterburner control which regulates afterburner fuel flow and exhaust nozzle area.

A multispool gas turbine power plant is one in which the compressor and the turbine are each split into a plurality of separate rotors, each rotor comprising one or more compressor or turbine stages. Each of the compressor rotors is connected to and driven by a turbine rotor, the unit forming what is called a spool. The various spools generally are coaxially arranged within the power plant. In a twin spool gas turbine power plant one or more of the downstream turbine stages are connected to and drive one or more of the upstream compressor stages, forming what is known as the low pressure spool since both the compressor stages and the turbine stages operate with gases at a lower pressure than the gases flowing through the remaining compressor and turbine stages. The remaining turbine stages are connected to and drive the remaining compressor stages, the unit surrounding the connection between the low pressure compressor and turbine stages and being known as the high pressure spool.

Fuel flow to a gas turbine power plant generally is metered as a function of the rotational speed of the compressor or turbine rotors, which in the case of most gas turbine power plants are connected together as a unit and rotate at the same speed. Multispool gas turbine power plants, however, have two or more spools which tend to rotate at various and independent speeds and only one spool speed is used as a signal to the main fuel meter or control. In the case of a twin spool power plant, it is customary, though not essential, to use the speed of the high pressure spool as the signal to the fuel control. This means that the speed of the low pressure spool is ungoverned and is controlled only through its unique relationship to the speed of the high pressure spool.

It is commonly the case with conventional twin spool power plants with fixed exhaust nozzle area that the speed of the low pressure spool is reduced as the temperature at the inlet to the low pressure compressor is increased, providing the speed of the high pressure spool is controlled to maintain a fixed turbine inlet temperature. This reduction in low pressure spool speed represents a loss in air flow through the power plant and, consequently, a loss in thrust which is not appreciable at subsonic air speed but which may reach values of 15 to 20 percent at low pressure compressor inlet temperatures corresponding to high speed supersonic flight. The speed of the low pressure spool can be controlled independently of the high spool speed by regulating the pressure drop of the gases across the low pressure turbine. This may be effected by varying exhaust nozzle area to increase or decrease the pressure downstream of the last turbine stage, thus bringing about a change in the pressure drop across the turbine and, consequently, a change in spool speed.

Flight at supersonic speeds is generally accomplished only during afterburning operation and as a result, increase of the pressure drop across the low pressure turbine for the purpose of holding the speed of the low pressure spool constant is needed only during afterburning operation. By varying exhaust nozzle area during afterburning operation as a function of low pressure compressor inlet temperature, speed regulation may be accomplished. It should be noted that for a power plant significantly affected by Reynolds number in the compressor, it may be desirable to also bias the exhaust nozzle area as a function of power plant inlet pressure or any power plant pressure which is proportional to inlet pressure.

It also should be noted that the procedure for maintaining constant low pressure spool speed is effective in providing added thrust as airplane Mach number is increased only up to the point where the gain in thrust due to added airflow is not exceeded by the loss in thrust due to tailpipe losses. This generally occurs at a specific tailpipe Mach number and can in turn be related to the low pressure compressor inlet temperature. By stopping the increase of exhaust nuozzle area above a specific value of the temperature, this loss of thrust is avoided.

The foregoing discussion relates to the obtaining of maximum thrust from the power plant at supersonic speeds. In addition, it is desirable in some applications to be able to obtain a thrust somewhat less than the maximum with afterburning but somewhat greater than that available from the power plant without afterburning. It has commonly been the practice to obtain this reduction of thrust by reducing both the low pressure and high pressure spool speeds through reduction of fuel flow to the main combustion section. Such a method has the disadvantages of reducing cycle efficiency and reducing power plant air flow. The latter disadvantage is undesirable because of the relatively small air flow range over which current supersonic inlet diffusers will operate stably at any particular Mach number.

By reducing thrust through a reduction of the afterburner temperature rise, it is possible to maintain reasonably efficient operation without changing the speed of either spool or changing the air flow through the power plant. This can be accomplished by properly coordinating the reduction of exhaust nozzle area with a reduction of afterburner fuel flow or fuel/air ratio. Under some circumstances it may be necessary to reduce thrust to a lower level than can be obtained solely by the foregoing procedure. This might be the case when the afterburner fuel flow has been reduced to the lean blowout limit. At this point, further reduction of thrust would be effected by selecting a lower speed for both the low and high pressure rotors.

An object of this invention, therefore, is to improve the operation of a multispool, afterburning gas turbine power plant.

Another object of the invention is to provide an afterburner control for an afterburning, multispool gas turbine power plant which enables maximum thrust to be obtained from the power plant at supersonic speeds.

Another object of the invention is to provide an afterburner control for an afterburning, multispool gas turbine power plant which enables operation of the power plant during partial afterburning without changing spool speed or air flow through the power plant.

Another object of the invention is to control afterburner operation of a multispool gas turbine power plant by manually scheduling exhaust nozzle area and at the same time establishing the datum for a speed governor for one of the spools.

Still another object of the invention is to provide an afterburner control which manually schedules exhaust nozzle area, which biases exhaust nozzle area as a function of compressor inlet temperature, and which regulates afterburner fuel flow to hold constant the speed of the low pressure spool in a twin spool gas turbine power plant.

Other objects and advantages will be apparent from the specification and claims, and from the accompanying drawing which illustrates an embodiment of the invention.

In the drawing:

The single figure shows an afterburner control in accordance with this invention in combination with a twin spool, afterburning gas turbine power plant for aircraft.

Referring to the drawing in detail, the gas turbine power plant is indicated generally at 10, the power plant having inlet 12, low pressure compressor rotor 14, high pressure compressor rotor 16, combustion section 18, high pressure turbine rotor 20, low pressure turbine rotor 22, afterburner 24, and exhaust nozzle 26 in succession in the direction of gas flow through the power plant. Compressor rotor 14 is connected to turbine rotor 22 by means of shaft 28 to form a low pressure spool. Rotor 16 is connected to turbine rotor 20 by means of sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and eyelids 36 for varying the area of exhaust nozzle 26.

Fuel is supplied to the power plant from tank 38. Fuel for combustion section 18 is pumped by pump 40 through conduit 42 to main fuel control 44. From here fuel is delivered to burner cans 46 in combustion section 18 through conduit 48 and annular manifold 50 connecting the burner cans. By means of gear 52 on sleeve 30 and gear shaft 54 connected to and driven by gear 52, main fuel control 44 meters fuel to combustion section 18 as a function of the speed of the high pressure spool. A control for metering fuel flow to a gas turbine power plant as a function of speed as well as other power plant operating variables is shown in co-pending application Serial No. 337,995, filed February 20, 1953, for Fuel Control for Gas Turbine Power Plants.

Fuel for the afterburner is supplied by pump 56 through conduit 58 to afterburner fuel control 60. Valve 62 in conduit 58 controls the admission of fuel to the afterburner fuel system and is intended to admit fuel to the control and the afterburner only when afterburning operation of the power plant is desired. Fuel flows from afterburner fuel control 60 through delivery conduit 64 to annular manifold 66 mounted within afterburner 24 and from which the fuel is discharged into the afterburner. Spark plug 68 is provided for initiating combustion in the afterburner.

Afterburner fuel control 60 includes liner 70 fixed within casing 72, the liner having one or more rectangular ports 74 communicating through annular groove 76 in casing 72 with delivery conduit 64. A movable sleeve 78, having one or more rectangular ports 80 substantially in alignment with ports 74, fits within liner 70 and is both rotated and translated to regulate fuel flow to the afterburner by varying the effective area of ports 74 and 80. Fuel from conduit 58 flows into sleeve 78 and then passes through ports 80 and 74, groove 76, and conduit 64 to the afterburner.

For the purpose of making fuel flow to the afterburner solely a function of the effective area of metering ports 74 and 80, the pressure drop across the ports is maintained constant by a suitable device which may include piston 82 within chamber 84 in casing 86. Conduit 88 connects delivery conduit 64 downstream of ports 74 and 80 with the lower end of chamber 84 to subject the bottom of piston 82 to afterburner fuel control outlet pressure. Conduit 90 connects inlet conduit 58 upstream of ports 74 and 80 with the opposite end of the chamber to subject the top of the piston to fuel control inlet pressure. Spring 92 assists the pressure from conduit 88 acting on the piston. In operation of the device, a variation in fuel pressure upstream or downstream of the metering port results in movement of piston 82 to vary the effective area of orifice 94 and the quantity of fuel by-passed through conduit 96 to the inlet of pump 56.

Sleeve 78 in afterburner fuel control 60 is moved axially under the influence of droop governor 98 connected to and driven by the low pressure spool in the power plant. The governor includes flyweights 110 mounted on annular plate 112 which surrounds stem 114 connected to sleeve 78. The flyweights act against shoulder 116 on the stem. The governor is connected to and senses low pressure rotor speed through a gear train including gear 118 mounted on the forward end of low pressure compressor rotor 14, the gear meshing with and driving gear shaft 120. Pinion 122 on the gear shaft meshes with and drives gear 124 integral with plate 112. During afterburning operation of the power plant, if the speed of the low pressure spool should change, the action of the flyweights upon shoulder 116 and sleeve 78 moves the sleeve axially to vary the effective area of metering ports 74 and 80 and regulate fuel flow to the afterburner accordingly. Speeder spring 126 positioned between shoulder 116 and abutment 128 is provided for loading the sleeve, the position of the abutment being varied as a function of a power lever setting. Power lever 130 is connected by link 132 to bell crank 134 which in turn is connected to abutment 128. Movement of the power lever varies the position of abutment 128 to adjust the datum of the speed governor.

In addition to being shiftable axially as a function of the speed of the low pressure spool, sleeve 78 is rotatable as a function of a power plant pressure. In the arrangement shown the rotational position of the sleeve is a function of compressor discharge pressure. This pressure is used to provide a proportionality between fuel flow and air flow, the latter being a function of pressure. The sleeve has integral therewith pinion 136 on stem 114, the pinion meshing with rack 138. The rack is connected by rod 140 to the free end of bellows 142, the opposite end of the bellows being connected to fixed surface 144. Pressure station 146 located in the combustion section inlet downstream of the last stage of high pressure compressor rotor 16 is connected by conduit 148 to the interior of bellows 142 so that variations in compressor discharge pressure cause expansion or contraction of the bellows and longitudinal movement of rack 138. This in turn rotates sleeve 78 to vary the area of metering ports 74 and 80 as a function of compressor discharge pressure and, consequently, as a function of air flow. It is to be noted that compressor discharge pressure is essentially the same as the pressure within combustion section 18, and that the pressure sometimes is referred to as burner case pressure.

Movement of power lever 130 schedules the area of exhaust nozzle 26 at the same time that it establishes the datum for governor 98. Link 132, as well as being connected to bell crank 134 for the governor, is connected to link 150 which in turn is connected to a servo mechanism controlling the position of eyelids 36. Movement of the power lever and link 132 rotates link 150 about relatively fixed pivot 152, the postion of the pivot being a function of the total temperature at the power plant inlet. Rod 154 is connected to the free end of liquid filled bellows 156, the opposite end of the bellows being connected to casing 158. Conduit 160 connects the interior of the bellows with temperature responsive bulb 162 mounted in power plant inlet 12 so as to sense total temperature within the inlet. Variations in inlet temperature expand or contract bellows 156 with the result that the position of link 150 and pivot 152 are adjusted as a function of compressor inlet temperature.

Rotation of link 150 about pivot 152 as a result of movement of power lever 130, or about pivot 163 as a result of expansion or contraction of bellows 156, moves pilot valve 164 in servo motor 166, the pilot valve being connected to link 150 at a point between the ends of the link. The pilot valve has a series of lands, 168, 170, 172 and 174 thereon, the lands controlling the admission of a suitable pressure to opposite sides of piston 176 for moving the piston. In this embodiment compressor discharge pressure is used as the moving force. Branch conduit 178 is connected to compressor discharge pressure conduit 148 and through it compressor discharge pressure is admitted to chamber 180 in casing 158 of the servo valve. Movable sleeve 182 surrounds pilot valve 164 and port 184 in the sleeve provides communication between chamber 180 and chamber 186 defined between lands 170 and 172 on the pilot valve. Movement of the pilot valve to the left uncovers port 188 in the sleeve to admit compressor discharge pressure through passage 190 to chamber 192 at the left of piston 176. At the same time chamber 194 at the right of the piston is connected through passage 196, port 198 in sleeve 182, and the groove between lands 172 and 174 with vent conduit 210. The pressure in chamber 192 moves piston 176 to the right which movement, through suitable linkage including rod 212 connected to piston 176 and rod 214 connected to eyelids 36, closes the eyelids and decreases the area of exhaust nozzle 26. Movement of pilot valve 164 to the right admits compressor discharge pressure from chamber 186 through port 198 and passage 196 to chamber 194 and vents chamber 192 through passage 190, port 188 and the groove between lands 168 and 170 to vent conduit 216. The pressure in chamber 194 will move piston 176 to the left to increase the area of exhaust nozzle 26.

Movable sleeve 182 is part of a "follow up" mechanism commonly provided for servo motors such as servo motor 166. The right end of the sleeve is connected by link 218, pivoted about its middle at pivot 220, to rod 212 on piston 176. Because of this connection between the sleeve and the piston, the sleeve always moves when the piston is moved, but in an opposite direction. Thus, when pilot valve 164 is moved to the right, piston 176 moves to the left and, at the same time, sleeve 182 moves to the right. Movement of both the piston and the sleeve terminates when ports 188 and 198 in the sleeve are aligned with lands 170 and 172 on pilot valve 164. At this time the servo system is in equilibrium.

A maximum fuel flow limit for the afterburner should be provided since a point is reached in afterburner combustion above which an increased fuel/air ratio reduces afterburner temperature, thereby decreasing afterburner thrust and increasing the speed of the low pressure spool. In the embodiment shown, adjustable bolt 222 acting against shoulder 224 on stem 114 of sleve 78 provides a maximum fuel flow limit. The maximum effective area of metering ports 74 and 80 cannot increase beyond the point where shoulder 224 contacts bolt 222. A minimum fuel flow limit also should be provided since combustion cannot be supported in the afterburner when the fuel/air ratio is reduced beyond the limit which supports combustion. Adjustable bolt 226 is provided to limit the minimum fuel flow to the afterburner, the bolt acting against the top edge of sleeve 78 to limit the minimum effective area of the metering ports.

As stated above, afterburner fuel metering ports 74 and 80 are rectangular in shape. Therefore, for a given axial position of sleeve 78 the ratio of the effective metering area to the rotation of the sleeve 78 as caused by compressor discharge pressure responsive bellows 142 is constant. Since a constant pressure drop is maintained across the metering ports, and since rotation of sleeve 78 is proportional to compressor discharge pressure, the ratio of afterburner fuel flow to compressor discharge pressure also is constant for a given axial position of sleeve 78. In the power plant operating range where afterburning normally is accomplished, air flow is essentially proportional to compressor discharge pressure. Therefore, it may be said that each axial position of sleeve 78 represents a constant afterburner fuel/air ratio with downward movement of sleeve 78 increasing the fuel/air ratio and upward movement of the sleeve decreasing the fuel/air ratio.

*Operation*

When any airplane using power plant 10 is ready for take off, power lever 130 is moved to its maximum counterclockwise position and afterburner 24 is set in operation. This position of the power lever establishes the maximum speeed for the low pressure spool and afterburner fuel flow through adjustment of the datum for droop governor 98 and establishes the area of the exhaust nozzle through servo motor 166. As the airplane forward speed increases the temperature of the air at inlet 12 increases and the characteristics of the power plant are such that the speed of the low pressure spool tends to decrease with the increase in temperature. By virtue of inlet temperature responsive bellows 156 and its connection with exhaust nozzle servo motor 166, an increase in inlet temperature will result in an increase in exhaust nozzle area.

The temperature increase in inlet 12 is sensed by bulb 162 and causes bellows 156 to expand. Expansion of the bellows rotates link 150 in a clockwise direction about pivot 163 to move pilot valve 164 to the right and admit compressor discharge pressure from chamber 186 to chamber 194 at the right of piston 176. At the same time chamber 192 at the left of the piston is vented. The pressure in chamber 194 moves the piston to the left the open eyelids 36 and increase the area of exhaust nozzle 26. As the piston moves to the left, sleeve 182 is moved to the right and finally ports 188 and 198 in the sleeve are cut off by lands 170 and 172, respectively, on the pilot valve. When this occurs movement of the piston is stopped and there is no further increase of exhaust nozzle area.

The increase in exhaust nozzle area reduces the pressure in afterburner 24, increasing the pressure drop across low pressure turbine rotor 22, which pressure drop will restore the speed of the low pressure spool. Thus, by means of the control the drop in low pressure spool speed which is the normal result of operation at increased compressor inlet temperature is prevented and maximum thrust is realized.

The control permits optimum operation at partial afterburning while holding the speed of the high pressure spool at its rated value by reducing exhaust nozzle area directly and holding low pressure spool speed constant by reducing afterburner fuel flow.

If, during afterburner operation of the power plant, decreased afterburning thrust is desired, power lever 130 is moved in a clockwise direction to a new position, moving link 132 to the left. Movement of the link to the left rotates link 150 about pivot 152 and moves pilot valve 164 in servo motor 166 to the left admitting compressor discharge pressure from chamber 186 to chamber 192 at the left of piston 176. At the same time chamber 194 at the right of the piston is vented. The pressure in chamber 192 moves the piston to the right to decrease exhaust nozzle area. As piston 176 moves to the right, sleeve 182 is moved to the left to restore equilibrium in the system. Movement of the piston then is stopped and there is no further decrease of exhaust nozzle area. The area will be that scheduled by the new position of the power lever.

As exhaust nozzle area decreases, static pressure in the afterburner increases, decreasing the pressure drop across low pressure turbine rotor 22. The decrease in pressure drop tends to decrease the speed of the low pressure spool, which speed should remain constant for optimum performance of the power plant. Any decrease in the speed of the low pressure spool lessens the force of flyweights 110 against shoulder 116. The reduced flyweight force permits sleeve 78 to move up to decrease the effective area of metering ports 74 and 80 and decrease the quantity of fuel flowing through delivery conduit 64 to the afterburner. This decrease in afterburner fuel flow decreases afterburner pressure and temperature, and consequently thrust, the decrease in pressure increasing the pressure drop across turbine rotor 22 and returning the speed of the low pressure spool to its original value.

At the same time that clockwise movement of power lever 130 was decreasing exhaust nozzle area, bell crank 134 connected to link 132 increased the load on speeder spring 126 to give a new droop characteristic to the governor. When the speed of the low pressure spool has returned to its original value, the force of flyweights 110 will balance the load of spring 126 at a new position of port 80 in sleeve 78 with respect to port 74. This new position affords decreased fuel flow to the afterburner at a decreased exhaust nozzle area to give less afterburner thrust, while at the same time the speed of the low pressure spool has been maintained substantially constant.

If increased afterburner thrust is desired during partial afterburning operation, power lever 130 is moved in a counterclockwise direction. This movement decreases the load on speeder spring 126 and actuates servo motor 166 to increase the area of exhaust nozzle 26. The resultant static pressure decrease in the afterburner increases the pressure drop across turbine rotor 22 and tends to increase the speed of the low pressure spool. Afterburner fuel flow, however, is increased by governor 98, decreasing the pressure drop across turbine rotor 22 and maintaining the speed of the low pressure spool at its original value. When sleeve 78 is in a new position of equilibrium between flyweights 110 and spring 126, afterburner thrust will have been increased through increased afterburner fuel flow and exhaust nozzle area, but the speed of the low pressure spool will have been maintained substantially constant.

It is to be understood that the invention is not limited to the specific embodiment herein illustrated and described, but may be used in other ways without departure from its spirit as defined by the following claims.

I claim:

1. A twin spool afterburning gas turbine power plant having a low pressure spool, a fuel supply for said afterburner, an exhaust nozzle, and means for varying the area of said nozzle, in combination with means for manually scheduling the area of said nozzle, means for biasing said manually scheduling means as a function of the temperature of air entering said power plant, means responsive to a power plant operating pressure for regulating fuel flow to said afterburner, and means responsive to the speed of said low pressure spool for regulating fuel flow to said afterburner.

2. A multispool gas turbine power plant having independently rotatable spools each including a compressor rotor and a turbine rotor, an afterburner, fuel supply means for said afterburner, an exhaust nozzle for said afterburner, and means for scheduling the area of said nozzle, in combination with a power lever, variable area metering means in said fuel supply means controlling fuel flow to said afterburner, means for sensing the speed of one of said spools, said speed sensing means being operatively connected to said metering means for varying the area of said metering means as a function of the speed of said one spool, and an operative connection between said lever, said nozzle area varying means and said speed sensing means for simultaneously scheduling exhaust nozzle area and establishing the speed of said one spool in accordance with the position of said lever.

3. A gas turbine power plant having a multistage axial flow compressor divided into two or more separate rotors, each of said compressor rotors including one or more compressor stages, a multistage turbine divided into two or more separate rotors, each of said turbine rotors including one or more turbine stages, each of said compressor rotors being connected to a turbine rotor to form a spool, said spools being independently rotatable, an afterburner, fuel supply means for said afterburner, an exhaust nozzle for said afterburner, and means for varying the area of said nozzle, in combination with a power lever, means operatively connected to and controlled by said lever for actuating said nozzle area varying means and scheduling the area of said nozzle, variable area metering means in said fuel supply means controlling fuel flow to said afterburner, means for sensing the speed of one of said spools, said speed sensing means being operatively connected to said metering means for varying the area of said metering means as a function of the speed of said one spool, and an operative connection between said lever and said speed sensing means for establishing the speed of said one spool.

4. A gas turbine power plant having a multistage axial flow compressor divided into two or more separate rotors, each of said compressor rotors including one or more compressor stages, a multistage turbine divided into two or more separate rotors, each of said turbine rotors including one or more turbine stages, each of said compressor rotors being connected to a turbine rotor to form a spool, said spools being independently rotatable, an afterburner, fuel supply means for said afterburner, an exhaust nozzle for said afterburner, and means for varying the area of said nozzle, in combination with a power lever, means operatively connected to and controlled by said lever for actuating said nozzle area varying means and scheduling the area of said nozzle, variable area metering means in said fuel supply means controlling fuel flow to said afterburner, means for sensing the speed of one of said spools, said speed sensing means being operatively connected to said metering means for varying the area of said metering means as a function of the speed of said one spool, means for varying the area of said metering means as a function of a compressor pressure, and an operative connection between said lever and said speed sensing means for establishing the speed of said one spool.

5. A gas turbine power plant having a multistage axial flow compressor divided into two or more separate rotors, each of said compressor rotors including one or more compressor stages, a multistage turbine divided into two or more separate rotors, each of said turbine rotors including one or more turbine stages, each of said compressor rotors being connected to a turbine rotor to form a spool, said spools being independently rotatable, an afterburner, fuel supply means for said afterburner, an exhaust nozzle for said afterburner, and means for varying the area of said nozzle, in combination with a power lever, means operatively connected to and controlled by said lever for actuating said nozzle area varying means and scheduling the area of said nozzle, variable area metering means in said fuel supply means controlling fuel flow to said afterburner, means for sensing the speed of one of said spools, said speed sensing means being operatively connected to said metering means for varying the area of said metering means as a function of the speed of said one spool, means for varying the area of said metering means as a function of a compressor pressure, means for regulating the pressure drop across said metering means, and an operative connection between said lever and said speed sensing means for establishing the speed of said one spool.

6. A multispool gas turbine power plant having independently rotatable spools each including a compressor rotor and a turbine rotor, an afterburner, fuel supply means for said afterburner, an exhaust nozzle for said afterburner, and means for varying the area of said nozzle, in combination with a manually operated power lever, means operatively connected to and controlled by said lever for actuating said nozzle area varying means and scheduling the area of said nozzle, temperature responsive means operatively connected to said actuating means for varying the area of said nozzle as a function of the temperature of air at one station within said power plant, variable area metering means in said fuel supply means controlling fuel flow to said afterburner, speed sensing means driven by one of said spools and operatively connected to said metering means for varying the area of said metering means as a function of the speed of said one spool, means for establishing the datum of said speed sensing means, and means operatively connected to said lever for adjusting said datum establishing means.

7. A multispool gas turbine power plant having independently rotatable spools each including a compressor rotor and a turbine rotor, an afterburner, fuel supply means for said afterburner, an exhaust nozzle for said afterburner, and means for varying the area of said nozzle, in combination with a manually operated power lever, means operatively connected to and controlled by said lever for actuating said nozzle area varying means and scheduling the area of said nozzle, temperature responsive means operatively connected to said actuating means for varying the area of said nozzle as a function of the temperature of air at one station within said power plant, variable area metering means in said fuel supply means controlling fuel flow to said afterburner, speed sensing means driven by one of said spools and operatively connected to said metering means for varying the area of said metering means as a function of the speed of said one spool, means for varying the area of said metering means as a function of a power plant pressure, means for regulating the pressure drop across said metering means, means for establishing the datum of said speed sensing means, and means operatively connected to said lever for adjusting said datum establishing means.

8. A twin spool gas turbine power plant having a high pressure spool including a compressor rotor and a turbine rotor, a low pressure spool including a compressor rotor and a turbine rotor, an afterburner, fuel supply means for said afterburner, an exhaust nozzle for said afterburner, and means for varying the area of said nozzle, in combination with a manually operated power lever, means operatively connected to and controlled by said lever for actuating said nozzle area varying means and scheduling the area of said nozzle, temperature responsive means operatively connected to said actuating means for varying the area of said nozzle as a function of the temperature of air entering said power plant, metering means in said fuel supply means controlling fuel flow to said afterburner, said metering means including cooperating ports capable of relative axial and rotational movement with respect to each other, a droop governor driven by said low pressure spool and operatively connected with one of said metering ports for imparting one of said movements thereto for varying fuel flow as a function of low pressure spool speed, pressure responsive means operatively connected with said one metering port for imparting the other of said movements thereto for varying fuel flow as a function of an engine operating pressure, means for establishing the datum of said governor, and means operatively connected to said lever for adjusting said datum establishing means.

References Cited in the file of this patent

UNITED STATES PATENTS

| | | |
|---|---|---|
| 2,644,513 | Mock | July 7, 1953 |
| 2,674,847 | Davies et al. | Apr. 13, 1954 |
| 2,705,864 | Peters | Apr. 12, 1955 |
| 2,736,166 | Mock | Feb. 28, 1956 |
| 2,753,685 | Mattinson | July 10, 1956 |
| 2,774,215 | Mock et al. | Dec. 18, 1956 |
| 2,778,191 | Thompson | Jan. 22, 1957 |
| 2,857,739 | Wright | Oct. 28, 1958 |
| 2,933,887 | Davies | Apr. 26, 1960 |

(Corresponding duplicate of French Patent 1,108,176, Aug. 24, 1955)

FOREIGN PATENTS

| | | |
|---|---|---|
| 161,680 | Australia | Apr. 16, 1953 |
| 1,108,176 | France | Aug. 24, 1955 |